US008603222B2

(12) United States Patent
Sceats et al.

(10) Patent No.: US 8,603,222 B2
(45) Date of Patent: Dec. 10, 2013

(54) SYSTEM AND METHOD FOR CALCINATION/CARBONATION CYCLE PROCESSING

(75) Inventors: Mark Geoffrey Sceats, Pyrmont (AU); Connor James Horley, Southport (AU); Patricia Richardson, legal representative, Coombabah (AU)

(73) Assignee: Calix Ltd., Gordon NSW (AU)

( * ) Notice: Subject to any disclaimer, the term of this patent is extended or adjusted under 35 U.S.C. 154(b) by 824 days.

(21) Appl. No.: 12/091,040

(22) PCT Filed: Oct. 23, 2006

(86) PCT No.: PCT/AU2006/001568
§ 371 (c)(1),
(2), (4) Date: Jul. 22, 2010

(87) PCT Pub. No.: WO2007/045048
PCT Pub. Date: Apr. 26, 2007

(65) Prior Publication Data
US 2010/0329963 A1  Dec. 30, 2010

(30) Foreign Application Priority Data

| Oct. 21, 2005 | (AU) | 2005905810 |
| Feb. 6, 2006 | (AU) | 2006900546 |
| Mar. 31, 2006 | (AU) | 2006901658 |
| Apr. 18, 2006 | (AU) | 2006901994 |
| May 3, 2006 | (AU) | 2006902293 |
| Aug. 22, 2006 | (AU) | 2006904553 |

(51) Int. Cl.
*B01D 53/02* (2006.01)

(52) U.S. Cl.
USPC ............... 95/107; 95/108; 95/109; 95/110; 95/111; 95/112; 96/108

(58) Field of Classification Search
USPC ........................... 95/107–112; 96/108
See application file for complete search history.

(56) References Cited

U.S. PATENT DOCUMENTS

| 736,869 A | 8/1903 | McTighe |
| 1,634,505 A | 7/1927 | McCaughey |

(Continued)

FOREIGN PATENT DOCUMENTS

| AU | 55715 73 A | 11/1974 |
| AU | 199477474 | 5/1995 |

(Continued)

OTHER PUBLICATIONS

Gumann, Sina; Supplementary European Search Report; Application No. 06790412.8-1218/ Patent No. 1948565; Jul. 11, 2011; 3 pages; the Hague.

(Continued)

*Primary Examiner* — Christopher P Jones
(74) *Attorney, Agent, or Firm* — Crain, Caton & James

(57) ABSTRACT

A system and method for calcination/carbonation cycle processing. The system comprises a calciner reactor for receiving partially carbonated mineral sorbent granules; a heat exchange structure for transferring heat through a wall of the calciner reactor to a granular flow of the sorbent granules for facilitating a calcination reaction of the sorbent granules to regenerate the sorbent granules; a gas extraction unit for removing gas products from the calciner, wherein the gas products comprise carbon dioxide from the calcination reaction; a carbonator reactor for receiving the regenerated sorbent granules from the calciner reactor and for receiving a cold flue gas, such that the regenerated sorbent granules are partially carbonised while the flue gas is scrubbed and the partially carbonated sorbent granules and the scrubbed flue gas exit the carbonator reactor as respective hot materials; and a riser unit for cycling the partially carbonated sorbent granules from the carbonator reactor to the calciner reactor.

21 Claims, 5 Drawing Sheets

(56) References Cited

U.S. PATENT DOCUMENTS

| | | | |
|---|---|---|---|
| 1,798,802 A | 3/1931 | Niles | |
| 1,810,313 A | 6/1931 | Hyde | |
| 2,015,642 A | 9/1935 | Walker | |
| 2,068,882 A | 1/1937 | Walker | |
| 2,080,981 A | 5/1937 | Haas | |
| 2,113,522 A | 4/1938 | Walker | |
| 2,155,139 A | 4/1939 | MacIntire | |
| 2,289,329 A * | 7/1942 | Prickett | 208/159 |
| 2,784,956 A | 3/1957 | Vogel | |
| 2,790,505 A * | 4/1957 | Dow | 95/124 |
| 2,992,065 A * | 7/1961 | Feustel et al. | 423/242.1 |
| 3,573,893 A | 4/1971 | Wadsted at al | |
| 3,684,476 A | 8/1972 | Wadsted | |
| 3,991,172 A | 11/1976 | Wicke et al. | |
| 4,017,585 A | 4/1977 | Angevine et al. | |
| 4,145,404 A | 3/1979 | Miyata et al. | |
| 4,235,425 A | 11/1980 | Beggs et al. | |
| 4,299,563 A | 11/1981 | Bryant, II | |
| 4,479,920 A | 10/1984 | Dodson | |
| 4,673,620 A | 6/1987 | Shulman et al. | |
| 4,740,157 A | 4/1988 | D'Agrosa | |
| 4,748,010 A | 5/1988 | Walker | |
| 4,828,617 A | 5/1989 | Csillag et al. | |
| 5,041,333 A | 8/1991 | Conroy | |
| 5,122,350 A | 6/1992 | Bryan | |
| 5,167,705 A | 12/1992 | Coughlan | |
| 5,211,733 A | 5/1993 | Fukao et al. | |
| 5,653,948 A | 8/1997 | Kato et al. | |
| 5,769,627 A | 6/1998 | Chisaki et al. | |
| 5,779,464 A | 7/1998 | Fan et al. | |
| 5,904,750 A * | 5/1999 | Cowles | 95/109 |
| 6,103,360 A | 8/2000 | Caldwell et al. | |
| 6,200,381 B1 | 3/2001 | Rechichi | |
| 6,231,650 B1 | 5/2001 | Mallow et al. | |
| 6,280,509 B1 | 8/2001 | Mallow | |
| 6,334,894 B1 | 1/2002 | Kostuch | |
| 6,783,799 B1 | 8/2004 | Goodson | |
| 7,025,940 B2 | 4/2006 | Shah et al. | |
| 2004/0194656 A1 | 10/2004 | Mallow | |
| 2005/0060985 A1 | 3/2005 | Abanades Garcia et al. | |
| 2006/0039853 A1 | 2/2006 | Fan et al. | |
| 2006/0093540 A1 | 5/2006 | Fan et al. | |
| 2008/0257158 A1* | 10/2008 | Howard | 96/127 |
| 2011/0113957 A1* | 5/2011 | Sceats | 95/15 |

FOREIGN PATENT DOCUMENTS

| | | |
|---|---|---|
| AU | 2002/301717 A1 | 4/2004 |
| DE | 3738301 A1 | 5/1989 |
| EP | 328-051 | 2/1988 |
| EP | 530-940 | 3/1993 |
| EP | 1661460 A1 | 5/2006 |
| FR | 1532049 A | 7/1968 |
| GB | 339105 | 12/1930 |
| GB | 1207612 | 10/1970 |
| GB | 1270359 A | 4/1972 |
| GB | 2043219 A | 10/1980 |
| GB | 2168984 | 7/1986 |
| JP | 2001-026754 | 1/2001 |
| JP | 2001-26764 | 1/2001 |
| KR | 20010093389 A | 10/2001 |
| KR | 20010093904 A | 10/2001 |
| RU | 1774922 A3 | 11/1992 |
| RU | 2096380 | 11/1997 |
| RU | 2096380 C1 | 11/1997 |
| RU | 2170044 C1 | 7/2001 |
| WO | 9401203 A1 | 1/1994 |
| WO | 97/01616 | 1/1997 |
| WO | 99/05688 A1 | 2/1999 |
| WO | 00/05178 A1 | 2/2000 |
| WO | 00/48709 A1 | 8/2000 |
| WO | 03/085039 | 10/2003 |
| WO | 2005/013695 A1 | 2/2005 |
| WO | 2005/046862 A | 5/2005 |
| WO | 2006/043820 A1 | 4/2006 |
| WO | 2007035421 | 3/2007 |
| WO | 2007/045050 A1 | 4/2007 |

OTHER PUBLICATIONS

Gumann, Sina; Supplementary European Search Report; Application No. 06804428.8-1218/ Patent No. 1951411; PCT/AU20060011568; Jul. 11, 2011; 7 pages; The Hague.

Abanades, J. Carlos; "Capture of C02 from Combustion Gases in a Fluidized Bed of Ca0"; Aiche Journal, New York, NY, US; vol. 50, No. 7; Jul. 1, 2007; pp. 1614-1622.

Hughes, Robin W. et al.; "Design, process simulation and construction of an atmospheric dual fluidized bed combustion system for in situ C02 capture using high-temperature sorbents"; Fuel Processing Technology, Elsevier BV, NL; vol. 86, No. 14-15; Oct. 1, 2005; pp. 1523-1531.

Anthony, Edward J. et al.; "Relationship Between S02 and Other Pollutant Emissions from Fluidized-Bed Combustion"; Twenty-Seventh Symposium (International) on Combustion; vol. 27, No. 2; Jan. 1, 1998; pp. 3093-3101.

Evans, S.M., Leksono, T., and McKinnel, P.D.; "Tributylin Pollution: A Diminishing Problem Following Legislation Limiting the Use of TBT-Based Anti-fouling Paints"; Elsevier Science Ltd., Marine Pollution Bulletin; vol. 30, No. 1; Jan. 1995; pp. 14-21.

International Search Report—PCT/AU2006/001568; Dec. 16, 2006; 2 pgs.; Patent Cooperation Treaty; Australian Patent Office; Woden Act, Australia.

International Preliminary Report on Patentability—PCT/AU2006/001568; 4 pgs.; Patent Cooperation Treaty; Australian Patent Office; Woden Act, Australia.

First Examination Report; Application No. 1015/MUMNP/2008; Government of India Patent Office, Mumbai, India; Jan. 4, 2012; 2 pages.

First Examination Report; Application No. 1014/MUMNP/2008; Government of India Patent Office, Mumbai, India; Feb. 6, 2012; 1 page.

Gumann, Sina; European Examination Report; Application No. 06 790 412.8-1218; European Patent Office, Netherlands; Feb. 3, 2012; 5 pages.

Xiaonan, Wu; The Second Office Action; Application No. 2006800048425.3; The Patent Office of the People's Republic of China, Beijing; Mar. 19, 2012; 6 pages.

Eigen, H. et al; Manufacturing Half-Decarbonised Dolomite with Active MgO in a Rotary Kiln; Zement-Kalk-Gips; 1955; pp. 44-47; vol. 8(2).

Shimizu et al; A twin fluid-bed reactor for removal of CO2 from combustion processes; Department of Chemistry and Chemical Engineering, Nigata University, Japan; vol. 77 Part A; Jan. 1999.

Abanades et al; Conversion Limits in the Reaction of CO2 with Lime; Department of Energy and Environment; 2003; pp. 308-315.

Written Opinion of the International Searching Authority—PCT/AU2006/001573; Nov. 27, 2006; 5 pages.

Written Opinion of the International Searching Authority—PCT/AU20067000424; May 29, 2007; 3 pages.

B.S. Terry et al; Catalysis by Water Vapour of Thermal Decomposition of Calcium Carbonate; Trans Inst. Mining and Metallurgy; 103; 1994; C62-C68.

Wang, Yong et al; The Effects of Steam and Carbon Dioxide on Calcite Decomposition Using Dynamic X-Ray Diffraction; Chemical Engineering Science; vol. 50 No. 9;1995; pp. 1373-1382.

Khinast et al; Decomposition of Limestone: The Influence of CO2 and Particle Size on the Reaction Rate; Chemical Engineering Science; vol. 51 No. 4; 1996; pp. 623-634.

Rothon, Roger Norman et al; Magnesium hydroxide filled EVA: The effects of filler surface modification on the strength of filler/matrix adhesion and the consequences for composite structure and properties; The Journal of Adhesion; vol. 78; Issue 7; 2002; pp. 603-328.

Beruto et al; Use of the Langmuir Method for Kinetic Studies of Decomposition Reactions: Calcite (CaCO3); Feb. 1974; pp. 2145-2153.

Troitzsch; Flame Retardant Polymers; Makromol. Chem., Makromol. Symp.; 74; 1993; pp. 125-135.

(56) References Cited

OTHER PUBLICATIONS

Sawai et al; Quantitative Evaluation of Anitfungal Activity of Metallic Oxide Powders (MgO, CaO and ZnO) by an Indirect Conductimertric Assay; Journal of Applied Microbiology; 2004; 96; pp. 803-809.
Sawai et al; Evaluation of Growth Inhibitory Effect of Ceramics Powder Slurry on Bacteria by Conductance Method; Journal of Chemical Engineering of Japan; 1995; vol. 28 No. 3; pp. 288-293.
E.A.M. Youssef; Characterization, Surface Modification, and Evaluation of Egyptian Dolomite Ore as an Extender Pigment for Paint; Pigment & Resin Technology; 2002; vol. 31 No. 4; 226-233.
Knibbs; The effect of Steam on Calcination; Lime and Magnesia; pp. 102-104; London, Ernest Benn, (1924).
Schilling, Karl; Recent Experiences in the Treatment of Dringking Water with the Magno Filter; Vom Wasser 1937; vol. 12.
D.P. Butt, et al;Kinetics of Thermal Dehydroxylation and Carbonation of Magnesium Hydroxide; J.Am.Ceram.Soc.; 1996; 79; 1892-1898.
J.E. Readman, et al; The use of in situ Powder X-Ray diffraction in the Investigation of Dolomite as a Potential Reversible High-Temperature $CO_2$ Sorbent; Phys. Chem. Chem. Phys.; 2005; 7; 1214-1219.
Satterfield, et al.; Kinetics of the Thermal Decomposition of Calcium Carbonate; A.I. Ch. E Journal; vol. 5 No. 1; pp. 115-122; (1959).
Written Opinion of the International Searching Authority—PCT/AU2007001835; Jan. 11, 2008; 5 pages.
McKenzie, Clyde, Jr; "Use of Quicklime to Increase Oyster Seed Production"; Aquaculture; 10; 1977; pp. 45-51.
Peis, Stefano; EP Examination Report; Jun. 20, 2011; Application No. 07718671.6-1215; 7 pages; Netherlands.
Dick, J.S.; "Compounding Materials for the Polymer Industries"; Noyes Publishing; 1987; pp. 63 and 144.
E. Cremer, Z: Electrochem; vol. 66; pp. 697-702; 1962.
The Patent Office of the People's Republic of China; Calix Pty Ltd.; Agent: Wu, Xiaonan; Application No. 200680048344.0; A Material Compound and a Method of Fabricating the Same; Issuing Date: Oct. 9, 2011.
MacIntyre, W.H., Stansel, T.B.; Steam Catalysis in Calcinations of Dolomite and Limestone Fines; 1953; pp. 1548-1555; Industrial and Engineering Chemistry.
Office Action; Application No. 200680048244; Feb. 12, 2010; 10 pages.
Office Action; Jan. 26, 2011; Application No. 200680048425.6; 3 pages.
Office Action; Application No. 200780020180.8; Mar. 11, 2010; 8 pages.
Notice of Acceptance; Application No. 2007233570; Nov. 5, 2010; 3 pages.
The Prospects for Carbon Capture and Storage; International Energy Agency; 2004; 252 pages.
C. Henderson; Clean Coal Technology Roadmaps; London, UK 2003; International Energy Agency; pp. 1-2.
Notice of Acceptance; Application No. 2006303830; Nov. 26, 2010; 4 pages.
Beruto, D.T. et al; Effect of mixtures of $H2O$ (g) and $CO2$ on the thermal half decomposition of dolomite natural stone in high $CO2$ pressure regime; 2003; pp. 25-33; vol. 404; Thermachimica Acta.
Written Opinion—PCT/AU2006/001568; Dec. 5, 2006; 4 pages.
Examiner's Report on Application No. 2002301717; Jun. 10, 2009; 3 pages.
McKee; Carbon Sequestration Leadership Forum. Final Draft Technology Roadmap, www.cslforum.org; 2004; 32 pages.
Beruto, D.T. et al; Solid Products and Rate-Limiting step on the Thermal Half Decomposition of Natural Dolomite in a $CO2$ (g) Atmosphere; Thermachimica Acta.; 2003; pp. 183-194; vol. 405.
Notice of Acceptance AU2006303828; Nov. 5, 2010; 3 pages.
Written Opinion of the International Searching Authority; PCT/AU2006/001572; Nov. 29, 2006; 5 pages.
International Preliminary Report on Patentablility—PCT/AU2007001835; Jun. 3, 2009; 6 pages
International Preliminary Report on Patentablility—PCT/AU20067000424; Feb. 26,2008; 3 pages.
International Search Report—PCT/AU20067000424; May 29,2007; 4 pages.
Written Opinion—PCT/AU20067000424; May 23, 2007; 3 pages.
International Search Report—PCT/AU2007001835; Jan. 11, 2008; 4 pages.
Written Opinion—PCT/AU2007001836; Jan. 3, 2008; 5 pages.
International Search Report; PCT/AU2006/001572; Dec. 13, 2006; 3 pages.
Schilling, Karl; Recent experiences in the Treatment of Drinking Water with the Magno Filter; 1937; pp. 41-74; vol.
removed due to translation.
International Search Report—PCT/AU2006/001573; Nov. 27, 2006; 4 pages.
International Preliminary Report on Patentabillity—PCT/AU2006/001573; Sep. 12, 2007; 4 pages.
Sawai et al; Quantitative Evaluation of Antifungal Activity of Metallic Oxide Powders (MgO,CaO and ZnO) by an Indirect Conductimetric Assay; J. Applied Microbiology; 2004; vol. 6; pp. 803-809.
Gregory A. Wilson, Non-Final Office Action, U.S. Appl. No. 12/295,468, Jul. 23, 2013, 9 pages, United States Patent and Trademark Office, Alexandria, VA, USA.

* cited by examiner

SYSTEM AND METHOD FOR CALCINATION/CARBONATION CYCLE PROCESSING

FIELD OF INVENTION

The present invention relates broadly to a system and method for calcination/carbonation cycle processing.

BACKGROUND

The environmental impact of anthropogenic carbon dioxide emissions, which are currently at about 23.4 Gtonne, is now recognised to be a major risk to mankind.

Carbon Capture and Sequestration (CCS) processes aim to reduce $CO_2$ emissions by capturing $CO_2$ from industrial processes, principally in the power, cement, and steel processes, that burn fossil fuels, and sequestering the $CO_2$ in deep saline aquifers, depleted oil and gas fields, deep coal seams, or deep ocean reservoirs.

There are three approaches to carbon capture for the CCS application—post-combustion capture, pre-combustion capture and oxy-fuel combustion. Pre-combustion capture would be used, for example, in an Integrated Gasification Combined Cycle power plant. However, the initial capital costs of a power plant based on this approach are believed to be very high. Oxy-fuel combustion uses oxygen instead of air, but suffers from the very high cost of separating oxygen from air, and may never be commercially viable. Post-combustion capture is believed to be the most promising CCS process, with the benefit of being more easily integrated into existing power generation systems.

The transport, sequestration and monitoring of CCS are both well established, and their costs are not a hurdle to the adoption of CCS. However, there is currently no established carbon capture process that has been shown to be economically viable for CCS. Only one carbon capture process is commercially used This process, called the MEA process, is currently used by the petroleum industry to separate $CO_2$ from natural gas, where the $CO_2$ has been injected into the reservoir to force out the hydrocarbons. The MEA process separates the natural gas from the $CO_2$, and regenerates the MEA sorbent for a cyclic process. MEA uses amines (and similar materials) as the sorbent, and the reverse process uses steam to release the $CO_2$ to regenerate the amine. The MEA process could operate today as a post combustion process in a power plant at a cost of US $50-70 per tonne of $CO_2$ avoided, well in excess of the target of US $10-20 per tonne of $CO_2$ avoided, as required for the CCS application. MEA cannot be currently used in its present form because it consumes too much energy from the power plant. MEA is a toxic material. Thus there is a world-wide effort to develop new carbon capture technologies that can meet the long term cost target for CCS.

Shimizu et al. (T. Shimizu, T. Hirama, H. Hosoda, K. Kitano: "A twin bed reactor for removal of $CO_2$ from combustion processes", Trans I Chem E, 77A, 1999) first proposed that a calcination/carbonation cycle be used to capture carbon from flue gases. The paper by Shimizu et al. proposes limestone carbonation at 600° C. for capturing the carbon from the flue gas, and regeneration of $CaCO_3$ above 950° C. by burning fuel with the $CaCO_3$, akin to conventional calcination, with pure oxygen from a separating plant, so as to give pure $CO_2$ and steam as an output. However, this approach is impractical, and limestone calcined above 950° C. will rapidly lose its reactivity due to sintering, as was demonstrated in the work of Shimizu.

Abandades and Alvarez ("Conversion Limits in the Reaction of $CO_2$ with Lime", Energy & Fuels, 2003, 17, 308-315) presented additional data and reviewed previous work on the Calcium calcination/carbonation cycle. They demonstrated that the fast reaction observed by all researchers was due to the calcination and carbonation of surfaces in micropores of the CaO, which are refilled in carbonation, and a smaller contribution from calcination and carbonation on the larger surfaces. Repeated sintering of the particles during the calcination cycles caused a gradual change in the morphology of the particles with a loss of the micropores, resulting in a loss of the fast component of the carbonation and a degradation of the sorbent.

Garcia at al. (A Garcia, J Carlos and J. Oakey; "Combustion method with integrated $CO_2$ separation by means of carbonation" US Patent publication no. 20060060985) described a process that uses this cycle. They claim a system based on a fluid circulating fluid bed reactor, drawn bed reactor, or cyclone reactor. Their patent discloses that heat transfer from the combustion reactor provides heat to the calciner, and the use of a partial vacuum or steam in the operation of the calciner. They specify a calcination temperature of 900° C. and a carbonation temperature between 600-750° C. They report that the replenishment of the sorbent is 2-5%, so that, on average, the limestone is cycled between 50 and 20 times.

The practical problems with this approach arise firstly from the lifetime of the reactivity of the granules. It is understood that the granules will react with the SOx contaminants in flue gases to produce $CaSO_3$, which is later oxidised to gypsum $CaSO_4$. The injection of limestone granules into hot flue gases to scrub the $SO_x$ is an existing technique referred to as "furnace sorbent injection". In addition, the limestone granules lose reactivity at high temperature in the calcination stage due to sintering. The calciner described by Garcia et at is a fluidized bed to take advantage of the high heat transmission coefficients. Alternatively, a pneumatic transported bed of pipes is described through which the steam is made to pass. The results of A. Abanades and D. Alvarez, Energy and Fuels, 2003, 17, 308-315, shows how the performance of a material that is produced (and later recycled) through 10 minute long calcination steps degrades. The cumulative sintering not only reduces the surface area but closes the pores.

L-S Fan and H. Gupta (US Patent publication no. 20060039853) also described a carbon capture process by limestone using the calcination/carbonation sorption cycle for application in the water gas shift reaction to promote plants hydrogen generation in the water gas shift reaction. They describe the use of a material described in a previous patent (U.S. Pat. No. 5,779,464) as a "super sorbent" as characterised by a high surface area and of 25 $m^2$ $gm^{-1}$ and a pore volume of 0.05 $cm^3$ $gm^{-1}$, and a mesoporous pore size distribution in the range of 5-20 nm diameter. Their objective was to make a limestone with a surface that mitigates the effect of "pore clogging", namely one that has a mesoporous structure, rather than a microporous structure with pores <2 nm.

A critical factor in the assessment of the viability of a CCS system is the energy, capital and operating costs of the processes and the footprint of the capture systems. The energy cost for an efficient regenerable sorbent system is largely determined by the integration of the process into the thermal processes of the power plants or industrial processes and is determined by the recuperation of heat, because the chemical energy of sorption and desorption is recovered. However, any ancillary processes that consume energy such as transfer of granules between reactors would create a penalty. The capital cost translates into the cost of the process, and simple scalable reactor designs are required. The operating costs include the cost of feedstock, and the sorbents used should have a long lifetime and should preferably, be a low cost to manufacture. The operating costs also include the cost of disposal of the spent sorbent, and preferably this should be non-toxic and a waste product that can be profitably consumed. It is understood that a major concern in developing a practical CCS system is the footprint of the reactor systems. Some concepts, when scaled, lead to a CCS system that is as large as the power generator.

A need therefore exists to provide a system and method for calcination/carbonation cycle processing that seeks to address at least one of the above mentioned problems.

SUMMARY

According to a first aspect of the present invention there is provided a system for calcination/carbonation cycle processing, the system comprising a calciner reactor for receiving partially carbonated mineral sorbent granules; a heat exchange structure for transferring heat through a wall of the calciner reactor to a granular flow of the sorbent granules for facilitating a calcination reaction of the sorbent granules to regenerate the sorbent granules; a gas extraction unit for removing gas products from the calciner, wherein the gas products comprise carbon dioxide from the calcination reaction; a carbonator reactor for receiving the regenerated sorbent granules from the calciner reactor and for receiving a cold flue gas, such that the regenerated sorbent granules are partially carbonised while the flue gas is scrubbed and the partially carbonated sorbent granules and the scrubbed flue gas exit the carbonator reactor as respective hot materials; and a riser unit for cycling the partially carbonated sorbent granules from the carbonator reactor to the calciner reactor.

The calciner reactor may comprise a feeder unit for the granules; a retort chamber having the feeder unit located at a top portion thereof, whereby the sorbent granules move through the retort chamber under gravitational forces in a granular flow; and the heat exchange structure is thermally coupled to a wail of the retort chamber for providing heat to the granules inside the retort chamber through heat transfer through the wall of the retort chamber.

The riser unit may pneumatically cycle the partially carbonated sorbent granules from a base of the carbonator reactor to the feeder unit at the top of the retort chamber.

The system may further comprise a mixer means disposed inside the retort chamber, the mixer means imparting at least horizontal forces on the granules moving through the chamber such that the granules are moved towards the wall of the retort chamber for facilitating the heat exchange to the granules through the wall of the retort chamber.

The gas extraction unit may comprise a gas/particles separator structure disposed inside the calcination reactor and coupled to exhaust openings of the retort chamber for facilitating separation of the gas products from the granules.

The gas extraction unit may comprise a vacuum pump for removing the gas products from the calciner reactor.

A gas used to pneumatically cycle the granules from the carbonator to the calciner may be steam.

The calciner reactor may comprise a plurality of retort chambers, each retort chamber comprising a feeder unit located at a top portion of said each retort chamber, whereby the granules move through said each retort chamber under gravitational forces in a granular flow; the heat exchange structure is thermally coupled to a wall of said each retort chamber for providing heat to the sorbent granules inside said each retort chamber through heat transfer through the wall of said each retort chamber; and the gas extraction unit removes the gas products from said each retort chamber.

The system may comprise a plurality of carbonator reactors, wherein the regenerated sorbent granules are fed serially through the plurality of carbonator reactors.

The system may further comprise a bleed unit for bleeding a portion of the calcinated granules from the calciner reactor prior to the carbonator reactor, and a feed unit for feeding a corresponding portion of fresh calcinated granules into the carbonator reactor.

The sorbent granules may have a size distribution between about 40 microns to about 125 microns.

The system may further comprise means for scrubbing dust from the gas products comprising the carbon dioxide.

The system may further comprise means for cooling the gas products comprising the carbon dioxide.

The system may further comprise means for compressing the gas products comprising the carbon dioxide.

According to a second aspect of the present invention there is provided a method for calcination/carbonation cycle processing, the method comprising the steps of receiving partially carbonated mineral sorbent granules in a calciner reactor; transferring heat through a wall of the calciner reactor to a granular flow of the sorbent granules for facilitating a calcination reaction of the sorbent granules to regenerate the sorbent granules; removing gas products from the calciner, wherein the gas products comprise carbon dioxide from the calcination reaction; receiving the regenerated sorbent granules from the calciner reactor and a cold flue gas in a carbonator reactor, such that the regenerated sorbent granules are partially carbonised while the flue gas is scrubbed and the partially carbonated sorbent granules and the scrubbed flue gas exit the carbonator reactor as respective hot materials; and cycling the partially carbonated sorbent granules from the carbonator reactor to the calciner reactor.

The calciner reactor may comprise a feeder unit for the granules; a retort chamber having the feeder unit located at a top portion thereof, whereby the sorbent granules move through the retort chamber under gravitational forces in a granular flow; and the heat exchange structure is thermally coupled to a wall of the retort chamber for providing heat to the granules inside the retort chamber through heat transfer through the wall of the retort chamber.

The partially carbonated sorbent granules may be pneumatically cycles from a base of the carbonator reactor to the feeder unit at the top of the retort chamber.

The method may further comprise imparting at least horizontal forces on the granules moving through the chamber such that the granules are moved towards the wall of the retort chamber for facilitating the heat exchange to the granules through the wall of the retort chamber.

The method may comprise utilising a gas/particles separator structure disposed inside the calcination reactor and coupled to exhaust openings of the retort chamber for facilitating separation of the gas products from the granules.

The method may comprise utilising a vacuum pump for removing the gas products from the calciner reactor.

A gas used to pneumatically cycle the granules from the carbonator to the calciner may be steam.

The calciner reactor may comprise a plurality of retort chambers, each retort chamber comprising a feeder unit located at a top portion of said each retort chamber, whereby the granules move through said each retort chamber under gravitational forces in a granular flow; the heat exchange structure is thermally coupled to a wall of said each retort chamber for providing heat to the sorbent granules inside said each retort chamber through heat transfer through the wall of said each retort chamber; and the gas extraction unit removes the gas products from said each retort chamber.

The method may comprise utilising a plurality of carbonator reactors, wherein the regenerated sorbent granules are fed serially through the plurality of carbonator reactors.

The method may further comprise bleeding a portion of the calcinated granules from the calciner reactor prior to the carbonator reactor, and feeding a corresponding portion of fresh calcinated granules into the carbonator reactor.

The sorbent granules may have a size distribution between about 40 microns to about 125 microns.

The method may further comprise scrubbing dust from the gas products comprising the carbon dioxide.

The method may further comprise cooling the gas products comprising the carbon dioxide.

The method may further comprise compressing the gas products comprising the carbon

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

Figure 1:
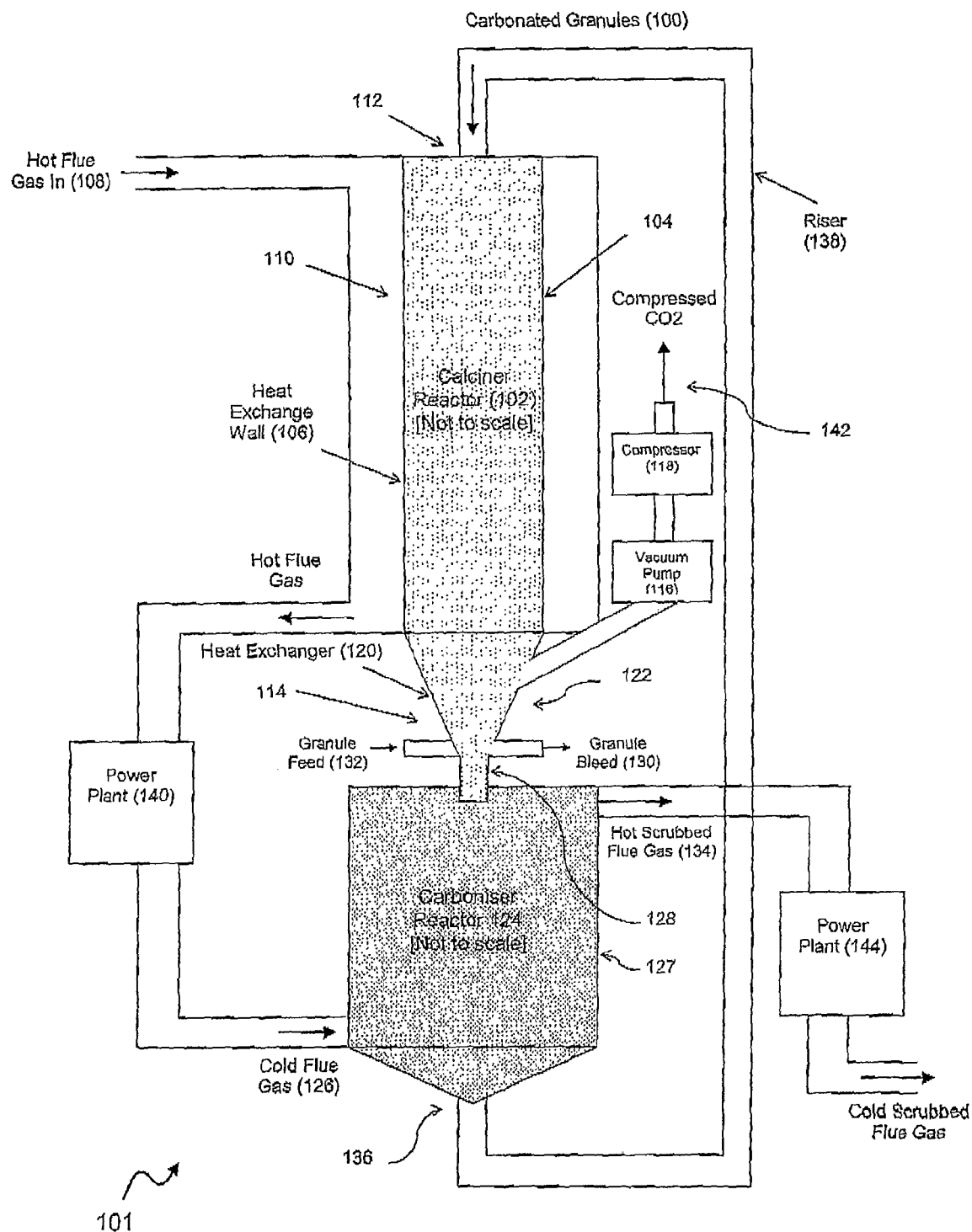
FIG. 1 shows a schematic vertical cross-sectional drawing of a calciner/carbonator reactor for calcination/carbonation cycle processing according to an example embodiment.

The described embodiments relate to a method for separating $CO_2$ and $SO_x$ from combustion gases using lime granules as the feedstock in a regenerative sorbent process. The embodiments described herein use as a common feature the calcination/carbonation cycle to remove the carbon dioxide using the reactions based on a metal oxide MD(s) sorbent. The chemical reactions that comprise the cycle are:—carbonation (carbon capture from flue gas)

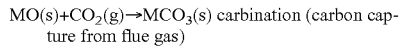

$MO(s)+CO_2(g) \rightarrow MCO_3(s)$ carbination (carbon capture from flue gas)

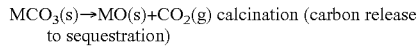

$MCO_3(s) \rightarrow MO(s)+CO_2(g)$ calcination (carbon release to sequestration)

The embodiments are based on a reactor system in which the granules are pneumatically transported between the carbonator reactor through which flows the flue gases and a calciner in which the sorbent is regenerated and the released carbon dioxide is scrubbed, if required, and mechanically compressed for sequestration.

The embodiments assume that the initial feedstock is preferably a "super sorbent" prepared using a steam catalytic calciner, but other methods of feedstock preparation are known in the art.

The embodiments further assume that the particles are spent through the reaction with $SO_x$ such that the end product, is a $MSO_4$ after oxidation. Thus the embodiments relate to a reactor system that is appropriate to removal of both $CO_2$ and $SO_x$ from flue gases.

The reactors described herein are appropriate to the use of calcium or magnesium (that is M=Ca or Mg). The calcium calcination/carbonation reaction operates at 900-950° C. for calcination and 600-750° C. for carbonation, whereas the magnesium calcination/carbonation reaction operates at 500-660° C. for calcination and 300-400° C. for carbonation. For the magnesium cycle, the sorbent may be magnesia MgO or a new material $MgO \cdot CaCO_3$, referred to herein by the trademark semidolime, or a mixture thereof. It is understood that reference to the new material using the trademark semidolime in the provided description is not to be viewed as making that name a generic description of the new material. For the calcium cycle, lime CaO is preferably used. The advantages of using semi-dolime as the sorbent are principally the cost of dolomite compared to magnasite, but also the pore clogging of semi-dolime is reduced by the "dilution" of the surface active MgO sites by the inactive $CaCO_3$ sites. The sorption efficiency of semidolime is limited to 0.31 kg of $CO_2$ per kg of $MgO \cdot CaCO_3$ sorbent compared to the extraordinary capacity of 1.09 kg of $CO_2$ per kg of MgO sorbent. By comparison with lime as sorbent, the cost of lime is less than dolomite, and limestone is already extensively used in power stations for $SO_x$ reduction. A calcium calcination/carbonation cycle can operate with no net increase in feedstock cost because the regenerative carbon capture cycle uses the lime many times before it is poisoned by the $SO_x$. For calcium sorbents the temperatures are higher and the enthalpies of reaction are higher than the magnesium sorbents, and thus the integration of the calcium cycle into an industrial process may be more difficult and expensive, whereas the magnesium cycle is potentially more adaptable.

The embodiments described herein are essentially the same for both calcium and magnesium based sorbents, and persons skilled in the art would appreciate the differences that are required. For example, those parts of the system continuously exposed to temperatures above 900° C. would be fabricated from alloys that were resistant at those temperatures, whereas the materials used at 650° C. would be lower cost, for example stainless steel.

A key challenge to the adoption of calcination/carbonation to carbon capture is likely to be the capital cost and footprint of the systems used for example, in a power plant. The embodiments described herein use a design in which these two parameters are reduced compared to existing techniques.

The described method uses a calcination process that seeks to minimise the residence time of the granules in the calciner reactor. There are two important consequences of this principle. Firstly the volume of the calciner/carbonator reactor system scales with the residence time in the reactor, for a given sorption efficiency. This is particularly important in the development of sorbent reactors that deal with the large carbon dioxide output of power stations and other large industrial processes. This will also be reflected in the capital cost and the footprint of the system. Secondly, the deleterious effects that arise from sintering of the granules scales with the cumulative residence time in the high temperature calciner reactor.

The described method also seeks to minimise the footprint of the reactor by using a slim gravity fed calciner module in which the residence time is between 1-10 seconds. Such a reactor would be 12-36 m high and would be such that the gravitational fall of a stream of granules, extended by mixer segments, has this residence time. The heat transfer into this reactor occurs through the walls of the retort, and relies on the high viscosity of the granular flow. The solids fraction of the flow has to be sufficient that the flow develops, but should not be too high that the heat transfer rate, most generally limited by heat transfer through the calciner walls, limits the conversion efficiency during the residence time. The advantage of using gravity to transport the granules is that it is low cost, and the handling of granules using pneumatics is understood.

The described method is applicable to the removal of $CO_2$ from flue gasses or from other discharges from industrial processes.

The described embodiments further provide a process of separating $SO_x$ and fly ash from the flue gas using said granules in separate desuiphonator reactors that use as its feedstock the spent granules from the array of calcinerIcarbonator reactors, and which capture the $SO_x$, fly ash and other pollutants before the flue gases enter the calciner/carbonator reactors described herein. The design of such a desuiphonator reactor is understood, and is not further described in this method. This method ensures that the granules in the calciner/carbonator reactors can be cycled to capture carbon dioxide for the maximum number of cycles before they become poisoned by residual $SO_x$ or they lose reactivity by the cumulative sintering.

The described embodiments deal with the separation of the $CO_2$ using the calcination and carbonation process in an array of coupled calciner/carbonator reactors, extracting the heat from gas streams exiting the reactors, and collecting the $CO_2$ for re-use and/or for containment in geological formations know as sequestration. The scaling of the reactors in an array facilitates managing the heat flows between the reactors, a result that derives from the use of the viscosity of the granular flow to cause heat transfer across the calciner walls.

In the described embodiments for a single calciner/carbonator reactor, the calcination is undertaken on partially carbonated granules in which the carbonation is on the surfaces of the granules, including the filled micropores and mesopores. The use of steam catalysis that is preferably used to fabricate the sorbent is not required in the described embodiments because the reaction takes place sufficiently quickly because the carbonised regions occur at surface regions of the granules it may be preferred to minimise the use of steam on the basis of cost. The reaction rate for calcination and carbonation slows down considerably as the reaction front moves into the deeper reaches of the particles. The granule surface area S(x) evolves during the calcination reaction through the degree of conversion x. Khinast et al demonstrated that their results could be modelled by a random pore distribution that evolves as:

$$S(x)=S_o(1-x)^{1.7}(1-37\ln(1-x))^{0.59} \text{ m}^2/\text{kmol}$$

where $S_o$ is the BET surface area in $m^2/kmol$ at x=o. This function initially increases as the departing carbon dioxide creates pores, and then decreases as the reaction zone approaches the core. It has been recognised by the inventors that, given the imperative to minimise the reactor residence time, it is more effective to only partially carbonate the granules and in each cycle use the initial fast calcination process to release the carbon dioxide. This approach sacrifices the very high sorption efficiency of the granules for other benefits. Thus, it has been recognised by the inventors that the degree of carbonation of the particles $\alpha^*$ can be set to the range of 30-50% in the described calcination/carbonation process such that the calcination proceeds from x=1 to x=$\alpha^*$. In this regime, the average value of S(x) exceeds unity.

FIG. 1 shows a calciner and carbonator reactor pair. However, it is noted that a carbonator reactor can more generally fed by a number of calciner reactors in different embodiments so that the flue gas handling is optimised. Referring to FIG. 1, carbonised granules at numeral 100 with a size distribution between about 40 microns to about 125 microns are injected into a calciner reactor 102, where the granules fall through the about 12 m length and are regenerated by calcination. The calciner retort is the inner tube 104 of the reactor 102, and the heat for the endothermic reaction is supplied through inner heat exchange walls 106. The calciner 102 also has static mixer segments (shown in FIG. 2) which assist the heat transfer, and to promote uniform calcination, and conical separator segments (shown in FIG. 3) to assist in the separation of the carbon dioxide from the granules in each segment. The residence time is set by the fall of the granular flow through the length, and is about 1.5 s. The flow of heat to maintain the calcination process is primarily supplied through the calciner walls 106 in this embodiment, the calciner walls 106 are heated at a heat exchange unit 108 by a heat exchange fluid, which may be compressed carbon dioxide, supplied from the power plant 140. The heat transfer to the granules falling through the calciner 102 is limited by the transport of heat through the calciner walls 106, as the heat transfer from the wall 106 to the granules is faster by virtue of the viscosity of the granular flow. The temperature in the calciner retort 104 experienced by the particles varies along the length of the retort 104, as determined principally by the balance of the heat transfer rate through the walls and the reaction rate The temperature inside the calciner retort 104 will increase down the calciner as the conversion takes place and will approach that of the heat exchange fluid. The reaction rate is quenched by the background carbon dioxide and this effect is reduced by the conical separators (FIG. 3), and the pumping of the gas from the calciner to produce a partial vacuum. The sorbent feed rate is controlled such that the sorbed $CO_2$ in the injected granules (ie $\alpha^*$=30-50%) is released in a single pass. With a diameter of about 0.3 m, the sorbent capacity of the calciner retort 104 is about 1-3 kg s$^{-1}$ releasing about 0.5 kg s$^{-1}$ of $CO_2$. The $CO_2$ produced by the calciner 102 is drawn out of the calciner 102 by a gas extraction unit comprising a vacuum pump 116 and a compressor 118 in the example shown in FIG. 1, which maintains the gas pressure in the calciner at not more than about 0.3 atm in the described example. The gas is passed through the power plant 146 to recuperate heat. The compressed $CO_2$ is available for sequestration, which is a process common to most carbon capture systems. The pressure is uniform within the calciner 102 of the described example. The carbon dioxide is extracted through the central tube of the gas/particles separators, as will be described below in FIG. 3. The volume of the calciner 102 is about 1 m$^3$. The volume could be reduced by decreasing the tube 104 diameter, with the constraint being that the heat transfer rate should be sufficient to achieve the required degree of calcination. The regenerated granules extracted from the base 122 of the calciner 102 are injected at the position 128 into a carbonator reactor 124. The carbonator reactor 124 is preferably based on an autothermal design. The flue gases from the power plant 142, after conditioning described in detail with reference to FIG. 4 below, are injected near the base 136 of the carbonator and pass through the falling fluidised bed of granules. The temperature of the carbonator is a balance of the heat released by the carbonation reaction and the heat in the granules and gasses entering and leaving the reactor. In the autothermal mode, the temperature is that at which the carbonation is complete. The flue gas 126 is heated and the granules injected at 128 are cooled. The carbonator walls 127 in this embodiment are insulating. For energy efficiency, the calciner/carbonator reactor system is preferably incorporated into the thermal cycle of the power plant, such that the hot scrubbed flue gas 134 are routed to the power plant 144 for conditioning, as will be described with reference to FIG. 4 below. It will be appreciated that there are many possible configurations which can depend not only on the thermal cycle but also on the choice of sorbent (calcium or magnesium or other). The carbonated granules are collected from the base 136 of the carbonator 124 and are transported pneumatically in a riser 138 to the entrance 112 of the calciner 102 to complete the cycle.

It will be recognised that the described example specifies the source of heat for the calciner 102 as coming from within the power plant 140, and the heat in the flue gases also comes from power plant 142. This heat is recuperated, as much as is possible, from the carbon dioxide at power plant 146 and the scrubbed flue gas at power plant 144. This annotation represents that the reactor system as a whole is integrated into a power plant or other industrial process so as to maximise the thermal efficiency of the overall process. The source of the heat may be provided as part of the power plant combustion system, or from steam from that plant, or by a separate energy source.

In another embodiment, superheated steam can be used in the system as the means for pneumatically transporting the particles in the riser 138. The superheated steam will saturate the granules during this process, when they are injected into the calciner, it will catalyse to a limited degree the calcination reaction. A further advantage of using steam to transport and saturate the granules is that the released steam in the calciner gas stream is easily separated by a condenser before the gas is compressed, leading to pure carbon dioxide product. The condensation assists in pumping out of the gases for reasons discussed below. The use of superheated steam in this way reduces the complexity of the pneumatic systems. However, it will be appreciated that steam and carbon dioxide at high temperature are understood to catalyse the sintering of the granules, and therefore steam is preferably used sparingly in the calciner 102.

Returning to the description of the calciner reactor 102, it is important to recognise that the efficiency of the calciner relies on the heat transfer efficiency across the calciner walls and the suppression of the back reaction with carbon dioxide. To achieve a high efficiency, the calciner embodiments described include a helical static mixer (FIG. 2) and conical gas separator (FIG. 3) inserts.

Figure 2:
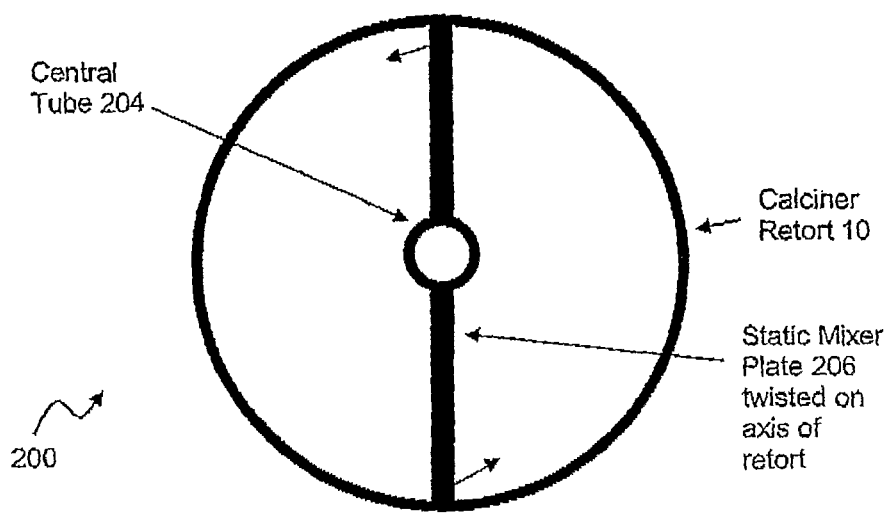
FIG. 2 shows a schematic horizontal cross-sectional view of a static mixer structure inside the calciner reactor of FIG. 1 in another embodiment.

Details of the static mixer in the example embodiment will now be described, with reference to FIG. 2. The static mixer 200 is used, in part, to increase the surface area for heat transfer, but the principle tasks of the static mixer 200 are to deflect kinetic energy into the $(r,\theta)$ plane to induce the granular flow, and to mix the granule flow streams to break up the tendency for the granules to form a laminar flow, so that the degree of calcination is uniform across the calciner by virtue of this mixing. It is understood that the static mixer 200 can, for example, be constructed from helical segments to achieve those tasks. In FIG. 2, the static mixer 200 provides uniform turbulent mixing of the particles and the steam, and maximises the interactions of the particles with the catcher walls 104. The static mixer 200 is fabricated from plate segments 206 having a width equal to the inner diameter of the calciner walls 104 (FIG. 1). The plate segments 206 are twisted at a pitch angle of about 33.3°, and having a segment length equal to the pitch, or one half of the pitch. Each segment is attached to a segment of the opposite handedness, rotated by 90°. The assembly of such segments is inserted into the calciner 102, and may be welded to it so that the surface area of the flange acts as a part of the heat exchanger system, or alternatively, joined in such a manner as to allow the segment to be vibrated so as to dislodge granules that would otherwise build up and constrict the particle flow. In the described embodiment, the assembly of the segments, i.e. the static mixer and the conical separator (FIG. 3) extends from the base of the calciner 102 to substantially underneath the throat 112 (FIG. 1). The central tube 204 is used to accommodate the gas flow from the conical separator in a tube 308 (FIG. 3) positioned below this static mixer as shown in FIG. 1.

Figure 3:
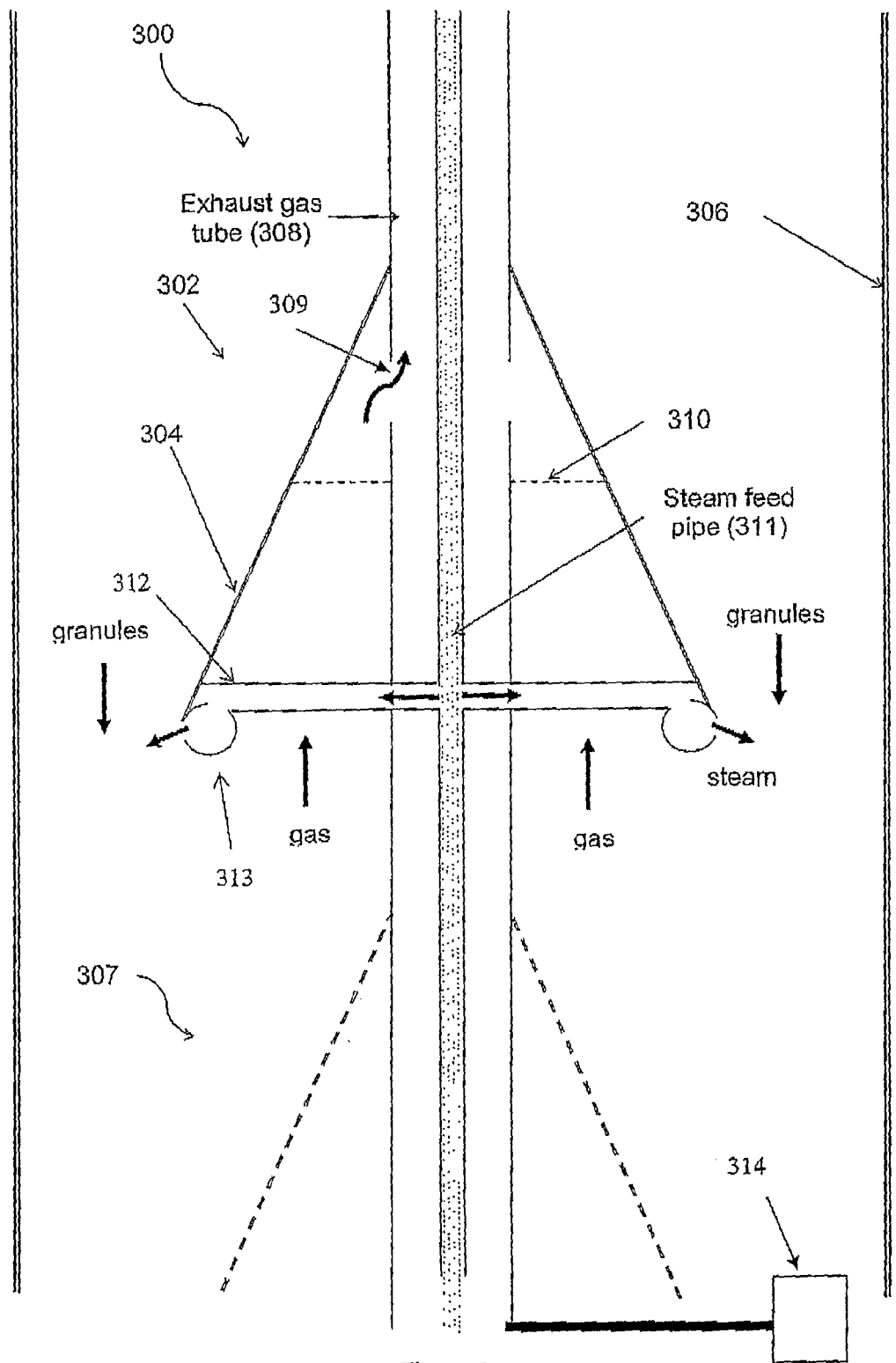
FIG. 3 shows a schematic vertical cross-sectional view of a gas/particle separator structure for use inside the calciner reactor of FIG. 1 in another embodiment.

Details of the conical solid-gas separator in the example embodiment will now be described, with reference to FIG. 3. In this embodiment, conical gas-solids separators are deployed along the retort. Each conical segment e.g. 302 is placed so that granules falling onto the exterior of the cone 304 are deflected to the calciner walls 306, and the solids density is increased as the particles flow down towards the base of the cone 304. The gases from the segment 306 below are exhausted by their upwards flow into the inner region of the segment 304 and are injected into the upper part of the next upper segment through a tube 308 that passes through the static mixer central tube 204 (FIG. 2). Breaking up of the granular flow, and the formation of dust in the conical separator is to be minimised. To prevent this dust from exiting the calciner, a screen 309 can be placed near the exhaust point of the gas and is electrically charged from an external battery so as to repel such disengaged granules, based on the fact that ground granules have a significant surface charge. That is, the separator 300 is designed to minimise granule entrainment in the exhaust. The separator can also be vibrated or rotated (vibrator unit or rotator unit 314) so as to eliminate the build-up of granules on surfaces. This separator structure 300 may be combined with a helical static mixer (compare FIG. 2) by alternating respective segments, so that the helical static mixer causes azimuthal and radial mixing of the granules (to achieve uniform conversion), while the cone section promotes efficient interaction with the calciner walls. Alternatively, the helical static mixer may be incorporated onto the outside of the conical structure 300. In a further embodiment, the background pressure of the carbon dioxide is reduced by partial evacuation of the calciner. It is noted that cooling of the exhausted gases as a stage of a gas compressor system will act as a pump. Steam may be injected in the conical separator 300 through a feed pipe 311 via pipe conduits 312 to a slotted ring 313 to provide not only a catalytic effect but also to flush the calciner to reduce the back reaction.

The reactor system 101 uses a very rapid calcination reaction. This preferably overcomes a number of practical hurdles to the use of the calciner/carboniser reaction for carbon capture. Firstly, the amount of time that the granules spend at high temperature has been minimised, and thus the effect of sintering is minimised. Sintering is cumulative, and at −1.5 seconds per pass, the cumulative effect is equivalent to 1.5 minutes of sintering if the rate of feeding and bleeding gives an average of 60-100 passes. It is expected that the surface of the granules will degrade during the multiple passes as has been demonstrated by others, but these studies demonstrate that the particles will not lose their reactivity with 1.5 minutes of sintering. The degradation of the sorbent is more likely to arise from poisoning of the surface by $SO_x$, in the flue gas.

The designs of the calciner and carbonator have a significant difference in that the calciner is reliant on heat transfer between the calciner wall 106 and the granules based on good conduction across this wall 106, whereas the walls 127 of the carbonator are insulating and the heat transfer is between the flue gases and the granules.

The calciner system described in FIG. 1 has a residence time for the granules of ~1.5 seconds for a typical system, the injection rate of granules with a degree of carbonation $\alpha^*=30\text{-}50\%$ is 1-3 kg s-1. At such rates, the heat transfer across the surface of the calciner in steady state is given by $$UA(T_e-T_c)=\gamma \alpha^* \Delta H_{calc}(T_c)$$

where $\gamma$ is feedstock injection rate in kg s$^{-1}$, A is the surface area of the calciner and $\Delta H_{calc}$ is the enthalpy of the reaction in J kg$^{-1}$, and U is the heat transfer coefficient in Wm$^{-1}$K$^{-1}$ from the external heat exchanger at its (average) temperature $T_e$ to the Feedstock particles at the (average) calcination temperature $T_c$, through the calciner surface. U is given by the expression $$U=1/(1/h_e+\delta r/k+1/h_c)$$

where $h_e$ is the heat transfer coefficient from hot flue gas 108 to the outer calciner wall 106, $\delta r$ is the wall 106 thickness and k is the heat conductivity of the wall 106 material, and to is the heat transfer coefficient from the inner surface of the wall 106 to the particles. The calciner heat exchange system is designed such that $h_e>>k/\delta r$. The viscosity of a granular flow is well approximated to be 1 Pa s, and this gives rise to a heat transfer coefficient $h_c>>k/\delta r$, where $h_c$ can be estimated from well established correlations of hydrodynamics. Thus, $U\sim k/\delta r$ in these embodiments. A reasonable temperature gradient can be established for the sorbent feed rates with a calciner diameter of ~0.3 m.

A single reactor system of the proposed design is capable of removing between ~0.5 kg s$^{-1}$ of carbon dioxide depending on the sorbent efficiency and the degree of sorption $\alpha^*$ for a temperature gradient of ~50° C. across the calciner walls. Flue gasses are produced in large volumes by an industrial scale combustion process. For example, a 1000 MW power plant consumes coal at 40 kg s$^{-1}$ and produces $CO_2$ at about 95 kg s$^{-1}$ with a total flue gas throughput of 440 kg s$^{-1}$. Using the reactor capacity described above, a farm of some 200 reactors can be implemented to scrub the $CO_2$, and this would be combined with one or more desuiphonator reactors to scrub the SOx prior to injection into the CO2 reactor farm using the spent sorbent from these reactors. Each reactor system described above has a footprint of less than 1 m$^2$, excluding pneumatic transport systems and heat exchangers, is such that the array of calciner retorts occupies a footprint of not less than 200 m$^2$. Practical considerations of the provision of ancillary services increases this footprint considerably, but this minimal footprint is demonstrates an implementation viability of the described design. It is noted that the solids fraction of the calciner reactor $\epsilon_{calc}$ is very small, of order $5\text{-}15*10^{-4}$. This is a small solids fraction for a reactor, and distinguishes the embodiment from other fluid bed reactors. It is sufficiently large, however, that the collective flow is established, and that flow creates the necessary viscosity and heat transfer. The $\epsilon_{calc}$ is small because of the limited surface area of the calmer determines the rate of heat transfer to the granules, and that heat transfer is restricted by the heat flow across the calciner walls. Too high a flow and the calcination yield will fall.

Turning now to the carbonator reactor 124, the reaction time for the carbonation $\tau_{carb}$ is related to the reaction time of calcination $\tau_{calc}$ by the approximate expression $$\tau_{carb}=\tau_{calc}\exp[\Delta H_{calc}(1/RT_{carb}-RT_{calc})]/P_{CO2,carb}$$

where $p_{CO2,carb}$ is the partial pressure of CO2 in the flue gases. For a typical system with $\tau_{calc}\sim1.5$ s, $\tau_{carb}\sim 90$ s. This difference has important implications in the design of the reactor in example embodiments, because the volume of granules in the carbonator reactor is approximately related to that of the calciner $V_{calc}$ by $$V_{carb}=N_{calc}V_{calc}t_{carb}/t_{calc}\epsilon_{calc}\epsilon_{carb}.$$

where $N_{calc}$, is the number of calciner reactors that discharge into the carbonator reactor and $\epsilon_{carb}$ is the solids fill factor of the carbonator. In the embodiment described in FIG. 1, $N_{calc}=1$. It is apparent that $V_{carb}$ can be reduced by using a carbonator design in which the solids fill factor $\epsilon_{carb}$ is high, say ~0.1. This is more typical of fluid bed reactors. In the limit of $N_{calc}=1$, a carbonator reactor retort with the same diameter as the calciner, namely 0.3 m, the height of the carbonator reactor would be ~4 m, giving a total height of the calciner/carbonator reactor of ~16 m, excluding the ancillary equipment. This embodiment shows that the larger volume for the carbonator reactor can be compensated for by the higher solids fraction, and in the example described above, it can have a smaller volume. In contrast to the calciner design, the heat transfer in the autothermal carbonator is between the granules and the gas, and this gives the freedom to minimise the volume by increasing the solids fraction. The calciner solids fraction $\epsilon_{calc}$ is constrained by the heat transfer across the calciner walls. The freedom to scale the carbonator allows the development of a flue gas treatment system in which $N_{calc}>>1$ to simplify the flue gas handling processes. Thus the granules from $N_{calc}$ calciners are fed into a carbonator and are recovered through $N_{calc}$ ports that feed the granules into the respective calciners. The design of the carbonator reactor takes account of the granule size and the entrainment of granules in the flue gas stream must be miminised. This technology is understood and not the subject of this invention.

Further, for a given carbon capture system, there may be $N_{carb}$ such carbonator reactors and $N_{sulf}$ desulphonator reactors that consume the spent granules from the carbonator reactors. The design of desulphonator reactors is understood and is not the subject of this invention.

Figure 4:
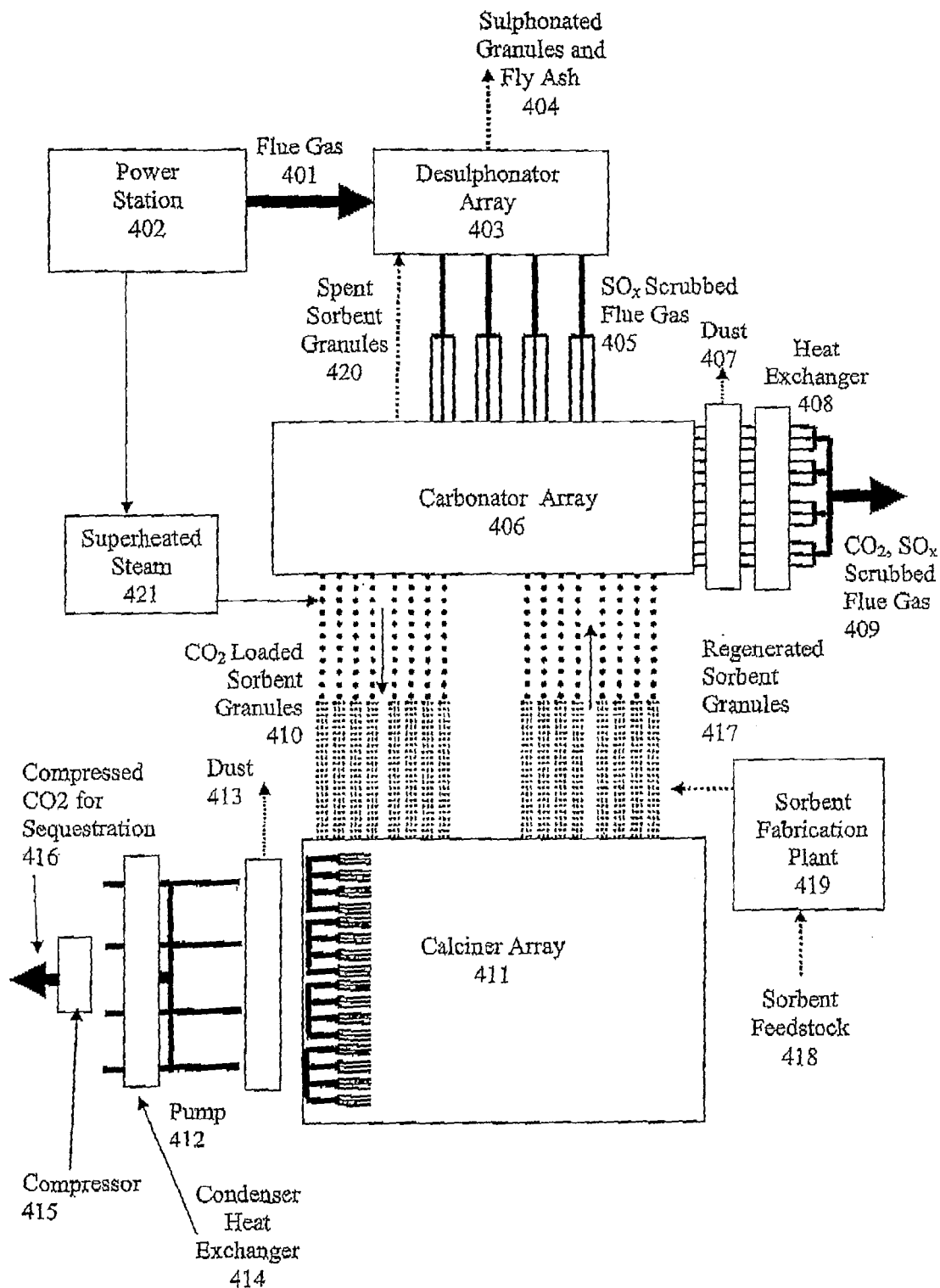
FIG. 4 is a schematic representation of a carbon capture system based on an array of calciner and carbonator reactors of the type described in FIG. 1 that may be deployed in a power station with desulphonator reactors.

The schematic layout of a system that captures $CO_2$ and $SO_x$ is set out in FIG. 4 in an example embodiment. The flue gas 401 from a power station 402 is distributed in the desuiphonator array 403 of $N_{sulf}$ desuiphonator reactors to extract the $SO_x$ and the fly ash such that sulphonated granules and fly ash, indicated at numeral 404, are produced as a useful waste by product, as is conventionally done in flue gas desulphurisation. The $SO_x$ and particulate scrubbed flue gas 405 is then injected into the carbonator array 406 of $N_{carb}$ carbonator reactors. In these reactors the $CO_2$ is scrubbed by the sorbent and the flue gas, now scrubbed of both $CO_2$ and $SO_x$ has the dust from entrained granules removed 407, and is cooled by a heat exchanger 408 before being released to the atmosphere. The order of the processes of dust removal 407 and heat exchange 408 in different embodiments depends on the method of integration of this system into a power plant 402, and the schematic representation in FIG. 4 should not be considered as a limitation.

The $CO_2$ loaded sorbent granules 410 are pneumatically transported to the calciner array 411. The $N_{calc}$ calciner reactors of the array 411 calcine the sorbent to release a pure stream of carbon dioxide which is pumped 412 from the calciners and the dust 413 from entrained sorbent granules is collected. A condenser/heat exchanger 414 is used to condition the gas which is then compressed 415 and is ready for sequestration. The order of the processes of dust removal, pumping and heat exchange depends on the method of integration of this system into a power plant, and the flow chart of FIG. 4 should not be considered as a limitation.

In the calciner array 411, the sorbent granules are regenerated by the aforesaid release of $CO_2$ and the regenerated sorbent granules 417 are then transported pneumatically to the carbonator array 406 to complete the process, Fresh sorbent granules produced from sorbent feedstock 418 in a sorbent fabrication plant 419 are introduced into the carbonator array 406. This is done at the same rate as the spent sorbent granules 420 are bled from the carbonator array and sulphonated granules are ejected 404 from the desulphonator array 403, so that the loading of the system by granules is maintained, taking into account the mass changes of granules in the respective processes and any particle decrepitation.

With reference to FIG. 4, it is noted that the routing of the gasses and granules is indicated only schematically. In one embodiment, the flue gas in the carbonator array 406 is routed through one or more of the carbonator reactors of the array 406 so as to achieve the optimum reduction of $CO_2$. When more than one carbonator reactors is so used, it is preferable to inject the fresh granules into the last carboniser where the partial pressure of $CO_2$ in the flue gas is significantly reduced from that at injection into the array. In this embodiment, the routing of the gases through the carbonator reactors leads to a progressive-reduction of $CO_2$ concentration, and the conditions for carbon capture in the last such reactor will be more stringent. In this case, there is a bleed of granules from this one carboniser to another such that, at the first carboniser that the flue gas passes through, the granules are bled into the desulphonator array 403. It will be appreciated that this utility of the described embodiment is dependent on the design of the carbonators, which is not the subject of the present application. However, this utility emphasises the flexibility of the modular approach in the described example embodiment.

With respect to desulphonation, in a practical system for capturing carbon from flue gases, any gases that permanently react with the sorbent should be removed or else the granules will be poisoned. The major component of flue gasses that has the capacity to poison the granules is sulphur dioxide/trioxide referred to as $SO_x$. For coal, this depends on the extent that the coal is washed to remove inorganic sulphides, and the organic content of the coal. While $SO_x$ is removed effectively by washing with limestone, this is a low temperature solution process and is not integrated with the described example. The bleed 420 of granules from the reactor system as part of the method to refresh the granules in the calciner/carboniser reactor system produces a product that has significant residual activity for reaction with $SO_x$.

The granules can be injected into the flue gas in the desulphonators array 403 at high temperature, add will react with the SOx, converting it to $MSO_3/MSO_4$. This is referred to as "furnace sorbent injection" and essentially replaces the $SO_x$ by $CO_2$. The $MSO_3/SO_4$ is in the form of MO granules in which the surface layer of about 30-50% is $MSO_3/MSO_4$ as a result of pore blocking discussed above for carbonation. This form of removing $SO_x$ does not require the flue gases to be cooled for solution based scrubbing, and then reheated for carbon removal. The amount of sorbent feedstock (limestone, dolomite) used by a plant for furnace sorbent injection may not be too different from one that firstly produces the sorbent from that feedstock in a calciner in a sorbent fabrication plant 419, and then uses that sorbent in the calciner 411 and carbonator 406 arrays and then uses the spent granules for scrubbing $SO_x$ in the sulphonator array 403, lithe C:S ratio in the flue gasses is say, 3%, and each granule goes through 60 cycles of removing $CO_2$, and the granules remove $SO_x$ with an efficiency of 30%, then the feedstock/sulphur ratio is 1:1, which is comparable to that for an efficient $SO_x$ scrubber. The granules from this process would be removed from the flue gas, and such capture would also capture fly ash. The solids product can be used as a filler for construction materials.

To appreciate the scale of the system, it is understood that flue gasses are produced in large volumes by an industrial scale combustion process. For example, a 1000 MW power plant consumes coal at 40 kg s$^{-1}$ and produces $CO_2$ at about 95 kg with a total flue gas throughput of 440 kg s$^{-1}$. Using the reactor capacity described above, a farm of some $N_{calc}$ $N_{carb}$=200 calciner reactors can be implemented to scrub the $CO_2$, and this would be combined with a number of $SO_x$ reactors to scrub the $SO_x$ prior to injection into the $CO_2$ reactor farm. In the embodiment described in FIG. 4, the flue gases progress through the system in a fixed path. However, the flow of the flue gasses between, say, the $N_{carb}$ carbonators can be reconfigured using valves that could isolate, say, any one module for repair and maintenance without substantially decreasing the flue gas flow. The autonomous regulation of the system to changes would allow the farm to maintain operation during a change of flow, providing that the changes occur relatively slowly on the timescale of minutes to hours.

In another embodiment, the calciner/carbonator reactor system described above with $N_{calc}$=1 can be miniaturised for use with small combustors, as the energy requirements are small, the system can regulate itself, and feedstock for fabricating the sorbents is plentiful, and the scrubbed material can be recycled with the compressed carbon dioxide.

Figure 5:
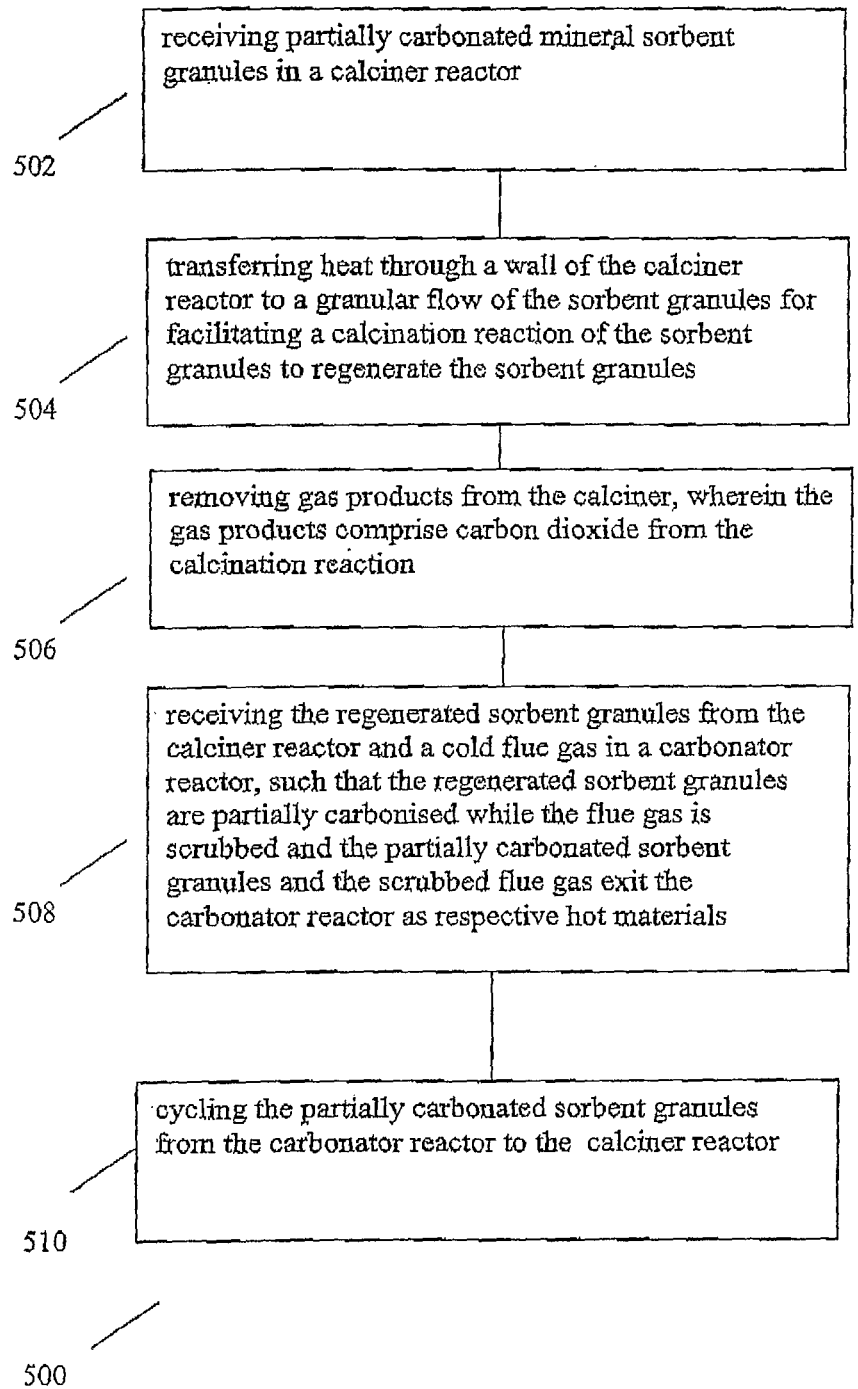
FIG. 5 shows a flow chart illustrating a method for calcination/carbonation cycle processing.

FIG. 5 shows a flow chart 500 illustrating a method for calcination/carbonation cycle processing. At step 502, partially carbonated mineral sorbent granules are received in a calciner reactor. At step 504, heat is transferred through a wall of the calciner reactor to a granular flow of the sorbent granules for facilitating a calcination reaction of the sorbent granules to regenerate the sorbent granules. At step 506, gas products are removed from the calciner, wherein the gas products comprise carbon dioxide from the calcination reaction. At step 508, the regenerated sorbent granules from the calciner reactor and a cold flue gas are received in a carbonator reactor, such that the regenerated sorbent granules are partially carbonised while the flue gas is scrubbed and the partially carbonated sorbent granules and the scrubbed flue gas exit the carbonator reactor as respective hot materials. At step 510, the partially carbonated sorbent granules from the carbonator reactor are cycled to the catcher reactor.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A system for calcination/carbonation cycle processing, the system comprising:
   mineral sorbent granules having a size distribution between about 40 microns and about 125 microns;
   A calciner reactor for receiving the mineral sorbent granules in a partially carbonated state, the calciner reactor being configured for granular flow of the partially carbonated sorbent granules under gravitational forces at a residence time of from 1 to 10 seconds;
   a heat exchange structure for transferring heat from hot flue gas through a wall of the calciner reactor to a granular flow of the sorbent granules for facilitating a calcination reaction of the sorbent granules to regenerate the sorbent granules;

a gas extraction unit for removing gas products from the calciner, wherein the gas products comprise carbon dioxide from the calcination reaction;

a carbonator reactor located below the calciner reactor for receiving the regenerated sorbent granules from the calciner reactor and for receiving a cold flue gas, such that the regenerated sorbent granules are partially carbonised while the flue gas is scrubbed and the partially carbonated sorbent granules and the scrubbed flue gas exit the carbonator reactor as respective hot materials; and a riser unit for cycling the partially carbonated sorbent granules from the carbonator reactor to the calciner reactor.

2. The system as claimed in claim 1, wherein the calciner reactor comprises:

a feeder unit for the granules;

a retort chamber having the feeder unit located at a top portion thereof, whereby the sorbent granules move through the retort chamber under gravitational forces in a granular flow; and the heat exchange structure is thermally coupled to a wall of the retort chamber for providing heat to the granules inside the retort chamber through heat transfer through the wall of the retort chamber.

3. The system as claimed in claim 2, wherein the riser unit pneumatically cycles the partially carbonated sorbent granules from a base of the carbonator reactor to the feeder unit at the top of the retort chamber.

4. The system as claimed in claim 2, further comprising a mixer means disposed inside the retort chamber, the mixer means imparting at least horizontal forces on the granules moving through the chamber such that the granules are moved towards the wall of the retort chamber for facilitating the heat exchange to the granules through the wall of the retort chamber.

5. The system as claimed in claim 2, wherein the gas extraction unit comprises a gas/particles separator structure disposed inside the calcination reactor and coupled to exhaust openings of the retort chamber for facilitating separation of the gas products from the granules.

6. The system as claimed in claim 1, wherein the gas extraction unit comprises a vacuum pump for removing the gas products from the calciner reactor.

7. The system as claimed in claim 1, wherein a gas used to pneumatically cycle the granules from the carbonator to the calciner is steam.

8. The system as claimed in claim 1, wherein the calciner reactor comprises a plurality of retort chambers, each retort chamber comprising a feeder unit located at a top portion of said each retort chamber, whereby the granules move through said each retort chamber under gravitational forces in a granular flow; the heat exchange structure is thermally coupled to a wall of said each retort chamber for providing heat to the sorbent granules inside said each retort chamber through heat transfer through the wall of said each retort chamber; and the gas extraction unit removes the gas products from said each retort chamber.

9. The system as claimed in claim 1, comprising a plurality of carbonator reactors, wherein the regenerated sorbent granules are fed serially through the plurality of carbonator reactors.

10. The system as claimed in claim 1, further comprises a bleed unit for bleeding a portion of the calcinated granules from the ealciner reactor prior to the carbonator reactor, and a feed unit for feeding a corresponding portion of fresh calcinated granules into the carbonator reactor.

11. The system as claimed in claim 1, further comprising means for scrubbing dust from the gas products comprising the carbon dioxide.

12. The system as claimed in claim 1, further comprising means for cooling the gas products comprising the carbon dioxide.

13. The system as claimed in claim 1, further comprising means for compressing the gas products comprising the carbon dioxide.

14. The system as claimed in claim 1, wherein the calciner reactor is configured for a residence time of said partially carbonated sorbent granules of about 1.5 seconds.

15. The system as claimed in claim 1, wherein the riser uses steam as a transport fluid.

16. The system as claimed in claim 15, wherein the steam is superheated steam.

17. The system as claimed in claim 1, wherein the calciner reactor is configured for a residence time of said partially carbonated sorbent granules of about 1.5 seconds.

18. A system for calcination/carbonation cycle processing, the system comprising:

mineral sorbent granules having a size distribution between about 40 microns and about 125 microns;

A calciner reactor for receiving the mineral sorbent granules in a partially carbonated state, the calciner reactor being configured for granular flow of the partially carbonated sorbent granules under gravitational forces at a residence time of from 1 to 10 seconds;

a heat exchange structure for transferring heat from hot flue gas through a wall of the calciner reactor to a granular flow of the sorbent granules for facilitating a calcination reaction of the sorbent granules to regenerate the sorbent granules;

a gas extraction unit for removing gas products from the calciner, wherein the gas products comprise carbon dioxide from the calcination reaction;

a carbonator reactor for receiving the regenerated sorbent granules from the calciner reactor and for receiving a cold flue gas, such that the regenerated sorbent granules are partially carbonised while the flue gas is scrubbed and the partially carbonated sorbent granules and the scrubbed flue gas exit the carbonator reactor as respective hot materials; and a riser red to use steam as a transport fluid for cycling the partially carbonated sorbent granules from the carbonator reactor to the calciner reactor.

19. The system as claimed in claim 18, wherein the steam is superheated steam.

20. A method for calcination/carbonation cycle processing, the method comprising the steps of:

receiving partially carbonated mineral sorbent granules having a size distribution between about 40 microns and about 125 microns in a calciner reactor;

providing for movement of the sorbent granules through the calciner reactor under gravitational forces in a granular flow at a residence time of from 1 to 10 seconds;

transferring heat from hot flue gas through a wall of the calciner reactor to the granular flow of the sorbent granules for facilitating a calcination reaction of the sorbent granules to regenerate the sorbent granules;

removing gas products from the calciner, wherein the gas products comprise carbon dioxide from the calcination reaction;

receiving the regenerated sorbent granules from the calciner reactor and a cold flue gas in a carbonator reactor located below the calciner reactor, such that the regenerated sorbent granules are partially carbonised while the flue gas is scrubbed and the partially carbonated sorbent granules and the scrubbed flue gas exit the carbonator reactor as respective hot materials; and cycling the partially carbonated sorbent granules from the carbonator reactor to the calciner reactor by a riser unit.

21. The method as claimed in claim 20, wherein the cycling of the partially carbonated sorbent granules uses steam as a sorbent trans tort fluid in the riser unit.

\* \* \* \* \*